United States Patent
Tanaka et al.

(10) Patent No.: US 11,287,046 B2
(45) Date of Patent: Mar. 29, 2022

(54) VALVE DEVICE

(71) Applicant: MIKUNI CORPORATION, Tokyo (JP)

(72) Inventors: Naoki Tanaka, Kanagawa (JP); Keigo Suzuki, Kanagawa (JP); Daisuke Takayama, Kanagawa (JP); Katsunari Tobe, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/765,874

(22) PCT Filed: Aug. 21, 2018

(86) PCT No.: PCT/JP2018/030864
§ 371 (c)(1),
(2) Date: May 21, 2020

(87) PCT Pub. No.: WO2019/130647
PCT Pub. Date: Jul. 4, 2019

(65) Prior Publication Data
US 2020/0362969 A1   Nov. 19, 2020

(30) Foreign Application Priority Data
Dec. 28, 2017   (JP) .............................. JP2017-252725

(51) Int. Cl.
*F16K 1/22*   (2006.01)
*F16K 27/02*   (2006.01)
*F16K 31/04*   (2006.01)

(52) U.S. Cl.
CPC ............ *F16K 1/221* (2013.01); *F16K 27/029* (2013.01); *F16K 31/047* (2013.01)

(58) Field of Classification Search
CPC ....... F16K 1/221; F16K 27/029; F16K 31/047
See application file for complete search history.

(56) References Cited

U.S. PATENT DOCUMENTS 2,624,541 A * 1/1953 Ziebolz ..................... F16K 1/22
                                                      251/283
2,759,697 A * 8/1956 Camphausen .......... F16K 31/36
                                                      251/25

(Continued)

FOREIGN PATENT DOCUMENTS

CN        106968804         7/2017
DE        102013016420      4/2015

(Continued)

OTHER PUBLICATIONS

"International Search Report (Form PCT/ISA/210) of PCT/JP2018/030864," dated Oct. 30, 2018, with English translation thereof, pp. 1-4.

(Continued)

*Primary Examiner* — Eric Keasel
(74) *Attorney, Agent, or Firm* — JCIPRNET

(57) ABSTRACT

A valve device of the present invention includes: a body (10) defining a passage (11) through which fluid flows; a valve shaft (20) pivotably supported by the body; a butterfly valve (30) fixed to the valve shaft to open and close the passage; and a drive unit (60) configured to impart a rotational drive force to the valve shaft. The body has a protrusion portion (17) formed integrally in a manner of protruding from an outer wall (10a) of the body, and the drive unit (60) is fixed to the body (10) via the protrusion portion (17). Accordingly, influence of heat of high-temperature fluid can be suppressed or prevented, and the opening and closing operation can be performed with high precision.

9 Claims, 11 Drawing Sheets

(56) References Cited

U.S. PATENT DOCUMENTS

| | | | | |
|---|---|---|---|---|
| 2,970,803 | A * | 2/1961 | Harza | F16J 15/46 |
| | | | | 251/175 |
| 8,347,908 | B2 * | 1/2013 | Golecki | F16K 27/06 |
| | | | | 137/375 |
| 8,931,759 | B2 * | 1/2015 | Bonanno | F16K 31/041 |
| | | | | 251/129.11 |
| 2013/0270470 | A1 | 10/2013 | Bonanno et al. | |
| 2017/0138274 | A1 | 5/2017 | Stark et al. | |
| 2017/0284310 | A1 | 10/2017 | Delplanque et al. | |
| 2018/0238209 | A1 | 8/2018 | Suzuki et al. | |

FOREIGN PATENT DOCUMENTS

| | | |
|---|---|---|
| DE | 102014113332 | 11/2015 |
| EP | 0193503 | 9/1986 |
| JP | H09133224 | 5/1997 |
| JP | H09280385 | 10/1997 |
| JP | H10153266 | 6/1998 |
| JP | 2002004894 | 1/2002 |
| JP | 2015137571 | 7/2015 |
| JP | 2017180837 | 10/2017 |
| JP | 2018151067 | 9/2018 |
| WO | 2007105311 | 9/2007 |
| WO | 2015078432 | 6/2015 |

OTHER PUBLICATIONS

"Office Action of China Counterpart Application" with English translation thereof, dated Jul. 5, 2021, p. 1-p. 17.

* cited by examiner

VALVE DEVICE

CROSS-REFERENCE TO RELATED APPLICATION

This application is a 371 application of the International PCT application serial no. PCT/JP2018/030864, filed on Aug. 21, 2018, which claims the priority benefits of Japan Patent Application No. 2017-252725, filed on Dec. 28, 2017. The entirety of each of the above-mentioned patent applications is hereby incorporated by reference herein and made a part of this specification.

BACKGROUND OF THE INVENTION

Technical Field

The present invention relates to a valve device including a butterfly valve for opening and closing a passage through which high-temperature fluid flows, for example, a valve device, such as an exhaust system of an engine or the like, applied when opening and closing a passage through which high-temperature exhaust gas.

Related Art

A conventional valve device may include a pipe member being cylindrical and defining a fluid passage, a valve shaft inserted crossing the pipe member, a support portion arranged in the pipe member for supporting both end portions of the valve shaft, a butterfly valve being disc-shaped and fixed to the valve shaft to open and close the fluid passage, and an abutting portion which is welded to an inner wall of the pipe member for the butterfly valve to abut against when the abutting portion is closed, and the like (for example, see patent literature 1).

In the valve device, the abutting portion against which the butterfly valve abuts is welded to the inner wall of the pipe member. Therefore, in order to prevent deformation caused by the welding, it is necessary to weigh the component shape in consideration of correction or thermal deformation after welding.

In addition, if laser welding or the like is used to suppress deformation caused by welding heat, equipment cost will increase, dimension management of the welded portion will be strict, and manufacturing cost will increase.

Furthermore, when the valve shaft is driven and rotated by a drive unit such as a motor or the like, the exhaust gas flowing through the pipe member has a high temperature, and thus it is necessary to suppress or prevent the influence of heat on the drive unit.

However, the valve device does not have any structure or the like for attaching the drive unit.

LITERATURE OF RELATED ART

Patent Literature

Paten literature 1: Japanese Patent Laid-Open No. 2015-137571

SUMMARY

Problems to be Solved

The present invention is completed in view of the above circumstance, and an objective of the present invention is to provide a valve device which can suppress or prevent influence of heat of high-temperature fluid and can perform an opening and closing operation with high precision.

Means to Solve Problems

The valve device of the present invention has a configuration including a body defining a passage through which fluid flows; a valve shaft pivotably supported by the body; a butterfly valve fixed to the valve shaft to open and close the passage; and a drive unit configured to impart a rotational drive force to the valve shaft, wherein the body has a protrusion portion formed integrally with the body in a manner of protruding from an outer wall of the body, and the drive unit is fixed to the body via the protrusion portion.

In the above configuration, a configuration may be employed in which the protrusion portion include a plurality of legs protruding apart from each other on the outer wall of the body.

In the above configuration, a configuration may be employed in which the plurality of legs is formed into a tapered shape having cross-sectional area decreasing from the outer wall of the body to a distal end side.

In the above configuration, a configuration may be employed in which a bracket attached to a distal end portion of the protrusion portion is included and the drive unit is fixed to the body via the bracket.

In the above configuration, a configuration may be employed in which the bracket includes a plate-like portion fixed to the protrusion portion, and an attachment portion that is formed bending from the plate-like portion and to which the drive unit is attached.

In the above configuration, a configuration may be employed in which the drive unit includes a case defining an outer contour, and a rotation shaft protruding from the case, and a connection mechanism configured to transmit a rotational force is arranged between the rotation shaft and the valve shaft.

In the above configuration, a configuration may be employed in which the connection mechanism includes a first connection lever detachably connected to an end portion of the valve shaft, and a second connection lever which is connected to the first connection lever and to which the rotation shaft is detachably connected.

In the above configuration, a configuration may be employed in which the second connection lever has a fitting hole to which the rotation shaft is removably fitted.

In the above configuration, a configuration may be employed in which the first connection lever and the second connection lever are engaged to be relatively movable across a predetermined range in an axis direction of the valve shaft, and a biasing spring imparting a biasing force in the axis direction of the valve shaft is arranged between the first connection lever and the second connection lever.

In the above configuration, a configuration may be employed in which the body includes a seal portion formed protruding in the passage in order that the butterfly valve abuts, in a full-close state, against the seal portion.

In the above configuration, a configuration may be employed in which the body is a cast product cast with a lost wax method in a manner of including a full-open stopper protruding into the passage in order that the butterfly valve abuts, in a full-open state, against the full-open stopper.

Effect

According to the valve device having the above configuration, the influence of the heat of the high-temperature fluid can be suppressed or prevented, and the opening and closing operation for the passage can be performed with high precision.

DESCRIPTION OF THE EMBODIMENTS

Figure 1:
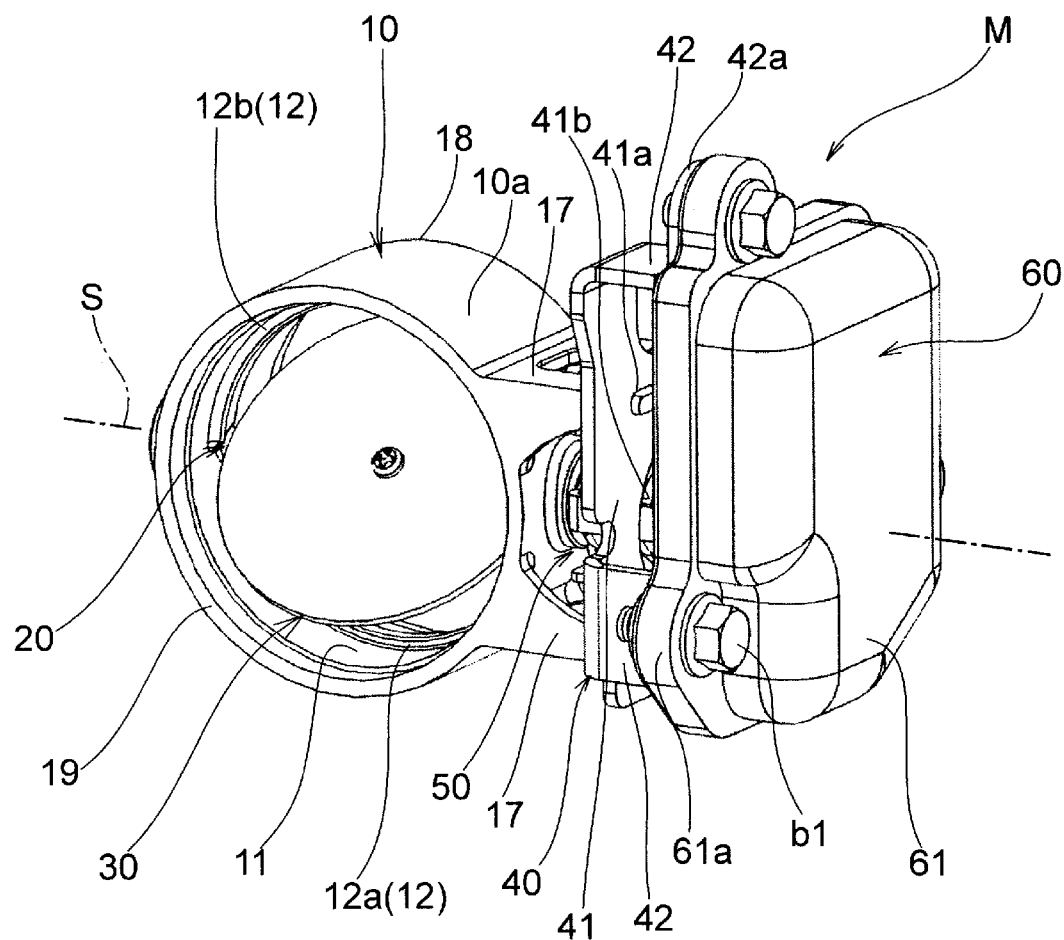
FIG. 1 is an external perspective view showing one embodiment of a valve device according to the present invention.
Figure 2:
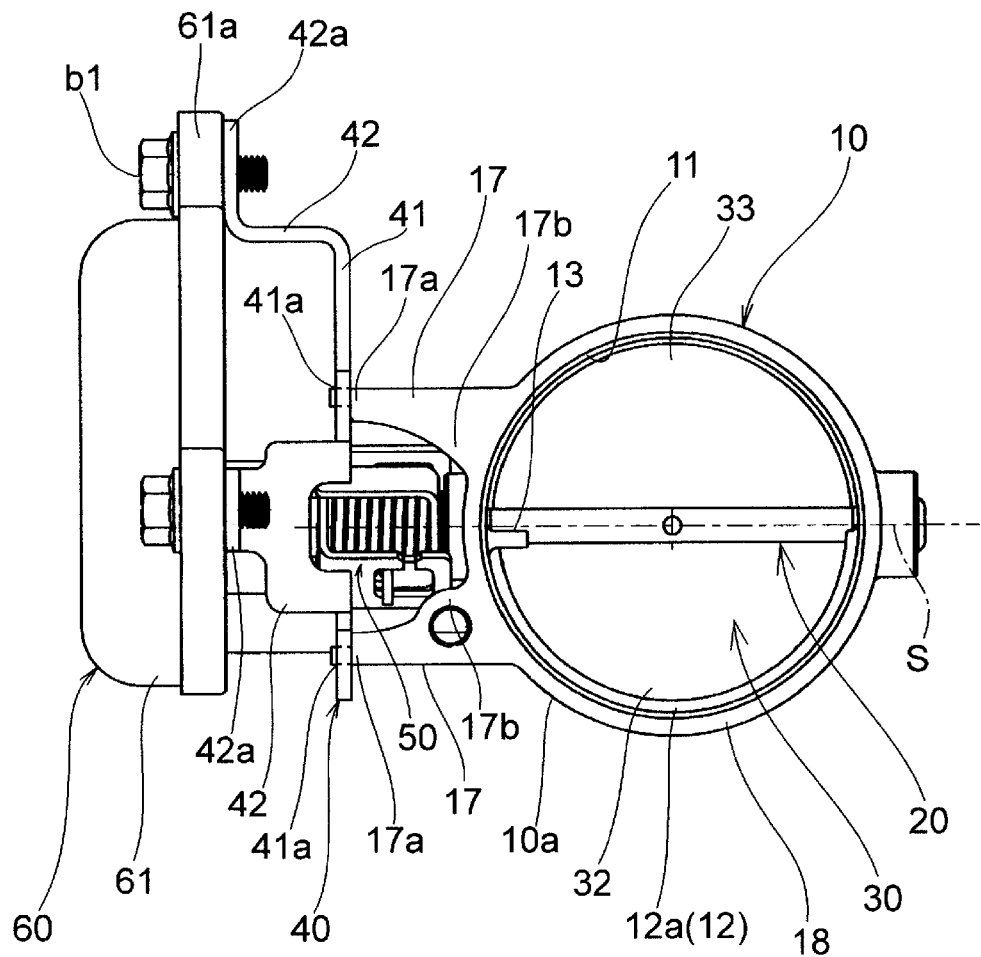
FIG. 2 is an end view of the valve device shown in FIG. 1 as viewed from one side of a passage.
Figure 3:
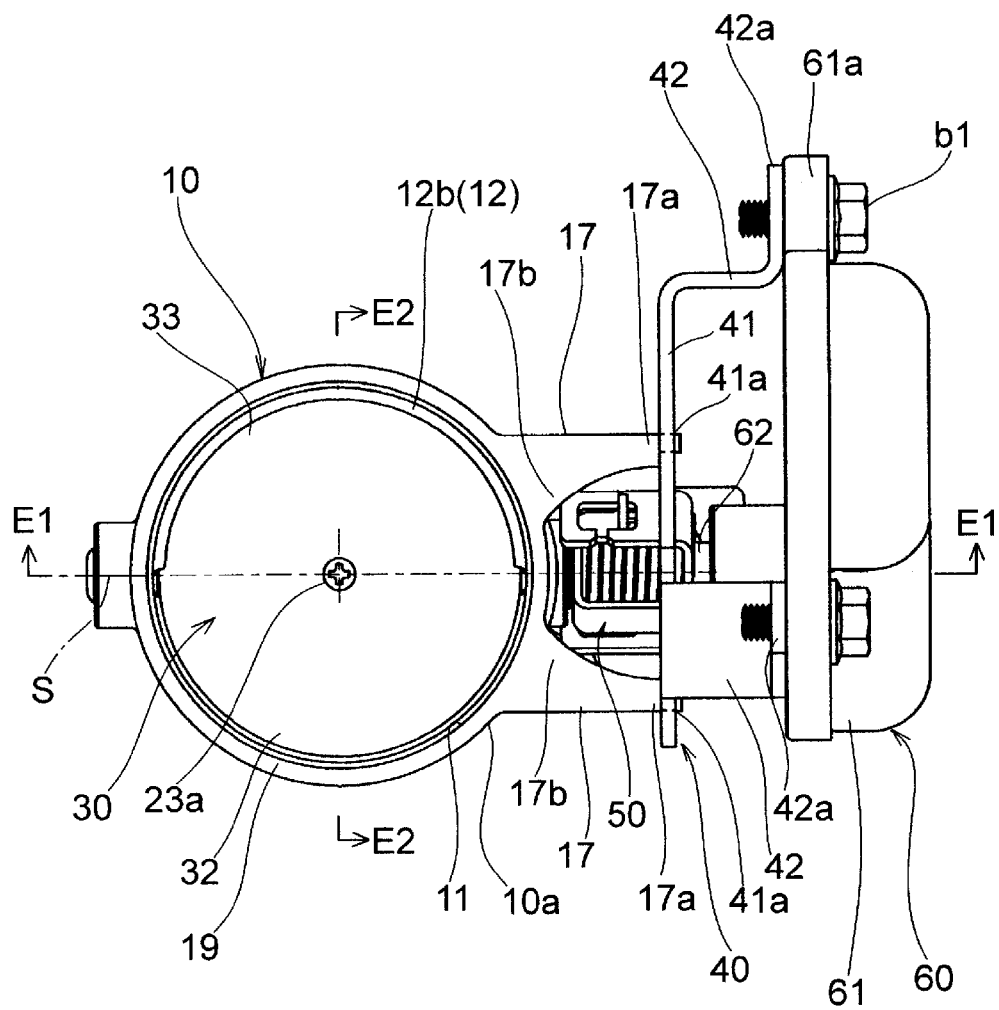
FIG. 3 an end view of the valve device shown in FIG. 1 as viewed from the other side of the passage.
Figure 4:
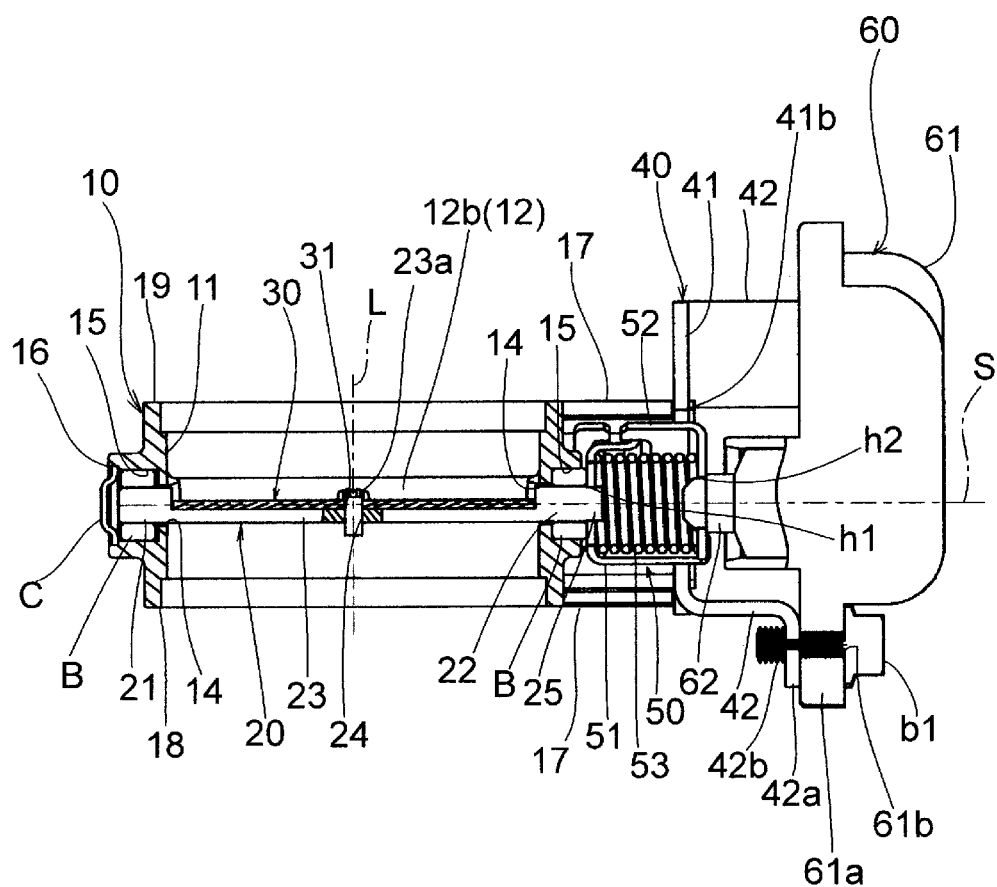
FIG. 4 is a cross-sectional view taken along a line E1-E1 in FIG. 3.
Figure 5:
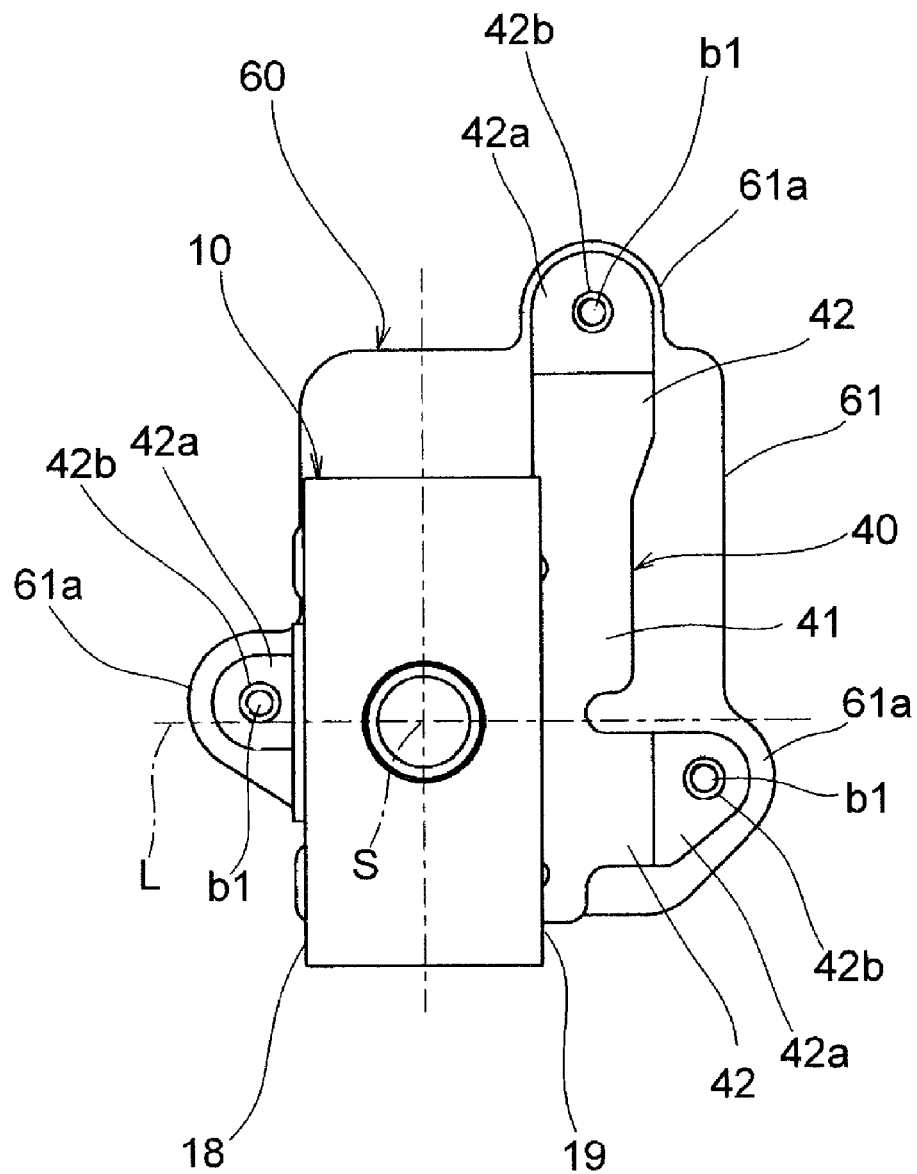
FIG. 5 is a side view of the valve device shown in FIG. 1 as viewed from an axis direction of the valve shaft.
Figure 6:
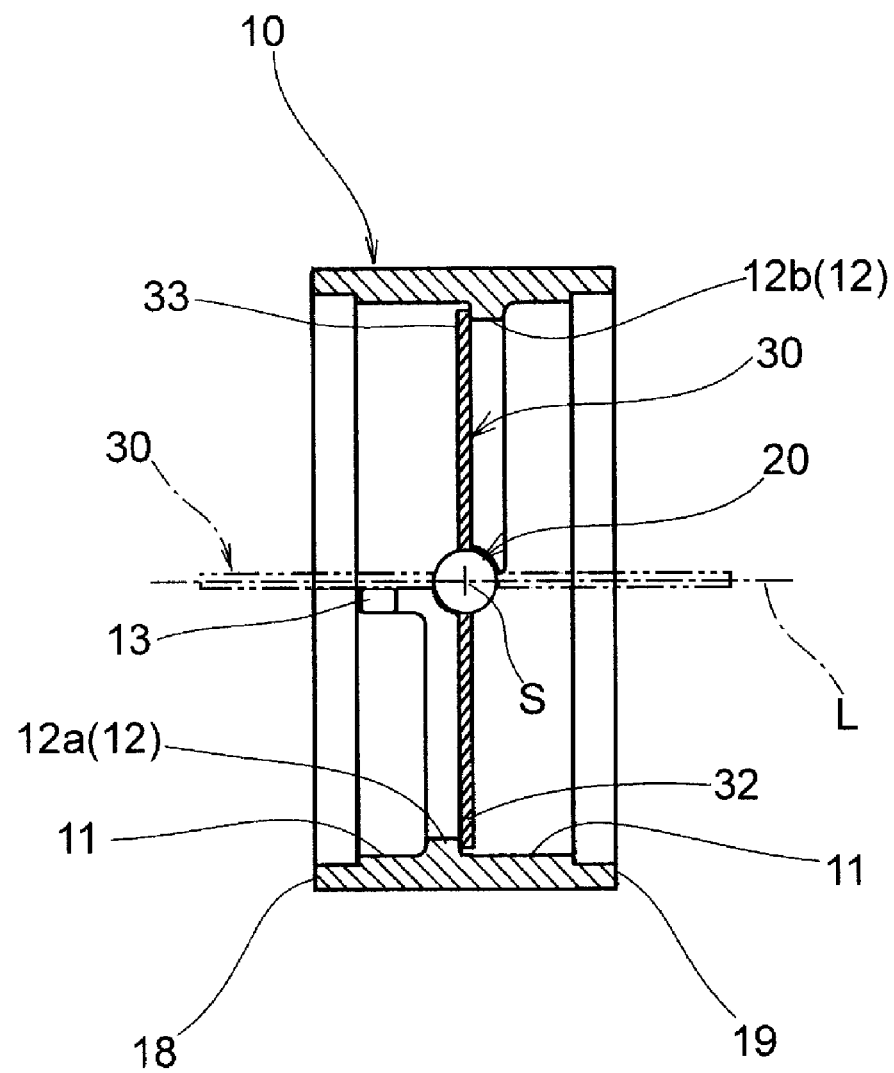
FIG. 6 is a cross-sectional view taken along a line E2-E2 in FIG. 3.
Figure 7:
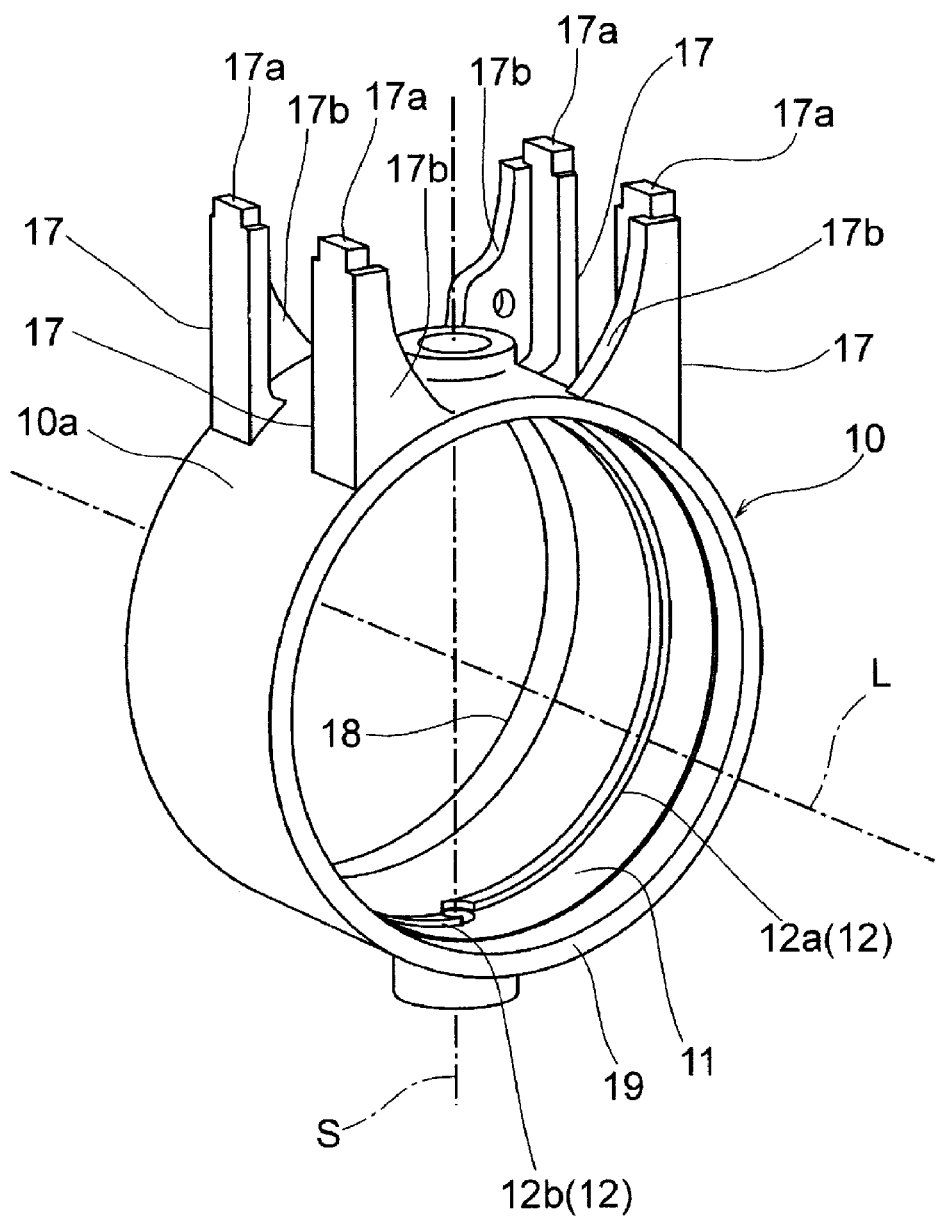
FIG. 7 is an external perspective view showing a body included in the valve device shown in FIG. 1.

An embodiment of the present invention is described below with reference to the accompanying drawings.

As shown in FIGS. 1 to 5, a valve device M according to the embodiment includes a body 10, a valve shaft 20 having an axis S, a butterfly valve 30, a bracket 40, a connection mechanism 50, and a drive unit 60.

The body 10 is a cast product cast with a lost wax method using a metal material such as stainless steel, iron or the like.

The body 10 includes a passage 11 through which fluid passes, a seal portion 12 formed protruding in the passage 11, a full-open stopper 13 formed protruding in the passage 11, two valve shaft holes 14 through which the valve shaft 20 passes, two fitting holes 15 for fitting bushes B, a concave portion 16 for fitting a cap C, a plurality of legs 17 serving as a protrusion portion for fixing the bracket 40, a first connection portion 18, and a second connection portion 19.

The passage 11 is formed as a cylindrical passage having a circular cross section with a predetermined inner diameter and having a centre on a centre line L. The seal portion 12 includes a first seal portion 12a and a second seal portion 12b which are cut off in regions of the valve shaft holes 14 and formed protruding in a semi-circular shape.

The first seal portion 12a is formed to define an abutting surface against which the butterfly valve 30 abuts at a position deviated from a centre of the valve shaft holes 14 (the axis S) toward one side in the direction of the centre line L.

The second seal portion 12 is formed to define an abutting surface against which the butterfly valve 30 abuts at a position deviated from the centre of the valve shaft holes 14 toward the other side in the direction of the centre line L.

The full-open stopper 13 is formed to define an abutting surface against which the butterfly valve 30 being in a full-open state abuts at a position deviated from the centre of the valve shaft holes 14 toward the one side in the direction of the centre line L and a position adjacent to the first seal portion 12a.

The two valve shaft holes 14 are formed, on the axis S extending perpendicular to the centre line L, into a cylindrical shape having an inner diameter dimension with which a first end portion 21 and a second end portion 22 of the valve shaft 20 are pivotably fitted.

The two fitting holes 15 are formed, at positions adjacent to the outside of the valve shaft holes 14 in the direction of the axis S, into a cylindrical shape having an inner diameter dimension with which bearings B are firmly fitted without any gap.

The concave portion 16 is formed into a counter-bore shape having an inner diameter greater than that of the fitting holes 15 for the cap C to be fitted and fixed.

The plurality of (four in the embodiment) legs 17 serving as a protrusion portion protrudes apart from each other in the direction of the axis S from an outer wall 10a of the body 10 and is formed into a tapered shape having cross-sectional area decreasing from the outer wall 10a toward a distal end side.

Each leg 17 has a distal end portion 17a to which the bracket 40 is attached, and a fin portion 17b expanding from the distal end portion 17a toward the outer wall 10a.

The distal end portion 17a is formed to include a seat surface against which the bracket 40 abuts and a coupling portion protruding from the seat surface and fitted and coupled into fitting holes 41a of the bracket 40.

Here, the distal end portion 17a is firmly fixed by welding, caulking processing, or other methods after the bracket 40 is fitted.

As described above, because the plurality of legs 17 is formed into a tapered shape having cross-sectional area decreasing from the outer wall 10a of the body 10 toward the distal end side, the mechanical strength against bending load and the like can be ensured, and heat transmission from the body 10 toward the bracket 40 can be suppressed.

In addition, because the plurality of leg portions 17 has the fin portions 17b, a heat radiation effect from surfaces of the plurality of leg portions 17 is also obtained, and the heat transmission toward the bracket 40 can be further suppressed.

That is, the plurality of legs 17 holds the drive unit 60 firmly at a position separated from the outer wall 10a of the body 10 and plays a role of heat-transmission suppressing and heat dissipation for releasing the heat of the high-temperature fluid flowing through the passage 11 to the outside and suppressing heat transmission to the drive unit 60.

Here, because the plurality of legs 17 is integrally formed with the body 10 by the same material, influence of heat distortion and the like can be suppressed as compared with a case where the legs are post-attached to the body by welding or the like, and the body 10 can be formed into desired shape and dimension.

The first coupling portion 18 and the second coupling portion 19 are formed to be connected to an exhaust pipe by fitting and coupling the exhaust pipe or using other connection spacers, a fastening bolt and the like in a state that the valve device M is interposed in the middle of the exhaust pipe which forms the exhaust passage.

As described above, the body 10 is a cast product cast by the lost wax method, and thus a highly heat-resistant metal material is used to mold a complex shape with high precision while ensuring smoothness of a casting surface. Therefore, the passage 11, the seal portion 12, the full-open stopper 13, the valve shaft holes 14, the fitting holes 15, and the like are formed at predetermined positions of the body 10 into predetermined dimensions with high precision.

On the other hand, the inner diameter dimension of the passage 11, the inner diameter and the width of the seal portion 12 and the like may be appropriately set by machining according to the required specifications.

The valve shaft 20 is formed into a columnar shape extending in the direction of the axis S using a metal material such as high corrosion-resistant stainless steel or the like.

Besides, the valve shaft 20 includes a first shaft portion 21 and a second shaft portion 22 having a columnar shape with the same outer diameter dimension, a flat portion 23 having a columnar shape partially cut into a stepped shape in order to fix the butterfly valve 30, a screw hole 24 formed substantially at the centre of the flat portion 23, and an end portion 25 formed continuously outside the second shaft portion 22.

The first shaft portion 21 and the second shaft portion 22 are formed to have an outer diameter dimension with which the first shaft portion 21 and the second shaft portion 22 are inserted through the valve shaft holes 14 of the body 10 and fitted into the bearings B.

The flat portion 23 is formed in a manner that the butterfly valve 30 is joined and a screw 23a is screwed into the screw hole 24 to thereby firmly fix the butterfly valve 30.

The end portion 25 is formed to have a substantially rectangular cross section to be fitted into a fitting hole h1 of a first connection lever 51 forming a part of the connection mechanism 50.

The two bushes B are formed into a cylindrical shape using a metal material such as high corrosion-resistant stainless steel, high corrosion-resistant stainless-steel alloy or the like.

Besides, the two bushes are respectively fitted into the two fitting holes 15 of the body 10 and function as radial bearings that pivotably support the one end portion 21 and the other end portion 22 of the valve shaft 20.

Accordingly, because the valve shaft 20 is pivotably supported via the bushes B mounted on the body 10, compared with a case where the valve shaft 20 is directly supported by the valve shaft holes 14 using the valve shaft holes 14 as bearing holes, the valve shaft 20 can be smoothly rotated.

In addition, by fitting the bushes B to the body 10, no gap is formed between the bushes B and the body 10 and between the valve shaft 20 and the bushes B, and thus the high-temperature fluid can be prevented from leaking to the outside of the body 10.

The butterfly valve 30 is formed into a disk shape centred on an intersection of the axis S and the centre line L using a metal material such as stainless steel or the like, and includes, at the centre of the butterfly valve 30, a circular hole 31 through which the screw 23a passes, and includes, using a straight line positioned on the axis S as a boundary, a first contour portion 32 on one side and a second contour portion 33 on the other side.

Besides, the butterfly valve 30 is joined to the flat portion 23 of the valve shaft 20 and is firmly fixed to the valve shaft 20 by screwing the screw 23a into the screw hole 24 of the valve shaft 20 through the circular hole 31.

Here, in the butterfly valve 30, in a full-close state where the passage 11 is fully closed, the first contour portion 32 abuts against the first seal portion 12a, and the second contour portion 33 abuts against the second seal portion 12b.

On the other hand, in the butterfly valve 30, in a full-open state where the passage 11 is fully open, the second contour portion 33 abuts against the full-open stopper 13.

The bracket 40 is formed using a metal material such as stainless steel or the like and includes a plate-like portion 41 and a plurality of (three in the embodiment) attachment portions 42 formed bending from the plate-like portion 41.

The plate-like portion 41 is formed into a substantially rectangular flat plate shape and includes a plurality of (four in the embodiment) the fitting holes 41a for fitting the distal end portions 17a of the plurality of legs 17 of the body 10, and a through hole 41b through which the connection mechanism 50 passes.

Each of the attachment portions 42 is formed bending from the plate-like portion 41 into a substantially L-shape, and includes, at a distal end side, a flat portion 42a to which a flange portion 61a of the drive unit 60 is joined and a screw hole 42b formed in the flat portion 42a.

Besides, the bracket 40 is firmly fixed to the body 10 in a manner that the distal end portions 17a of the legs 17 are coupled to the fitting holes 41a. Here, welding, caulking processing, and other firm coupling methods can be applied as a coupling method.

In addition, in the state where the bracket 40 is fixed to the body 10, the attachment portions 42 fix the drive unit 60 at a position further away from the plate-like portion 41 in the direction of the axis S with respect to the body 10.

As described above, the drive unit 60 is fixed to the body 10 via the bracket 40. Therefore, when there are various drive units 60 having different specifications such as the shape or the model of the case, by employing various brackets 40 corresponding to the respective drive units 60, a common body 10 is utilized, and various valve devices M that are desired can be provided.

In addition, because the bracket 40 has a form including the plate-like portion 41 and the plurality of attachment portions 42 formed separately from each other by bending the plate-like portion 41, a heat radiation effect of releasing heat transmitted to the bracket 40 from the surface of the bracket 40 is also obtained, and heat transmission toward the drive unit 60 can be suppressed.

Furthermore, because the bracket 40 has the plate-like portion 41, radiant heat radiated from the outer wall 10a of the body 10 can be blocked by the plate-like portion 41, and the influence of heat on the drive unit 60 can be reduced.

Figure 8:
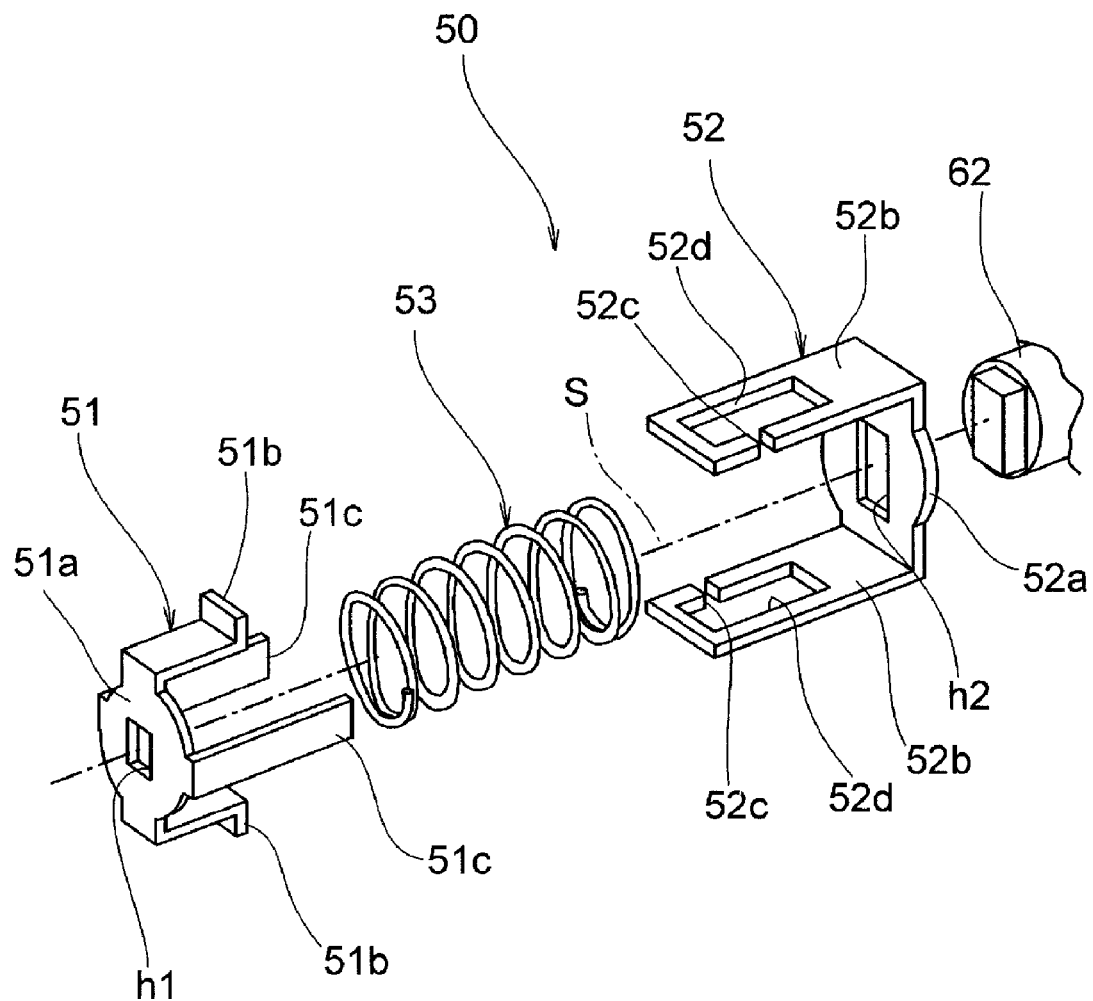
FIG. 8 is an exploded perspective view showing a connection mechanism included in the valve device shown in FIG. 1.

The connection mechanism 50 connects the end portion 25 of the valve shaft 20 and a rotation shaft 62 of the drive unit 60 to transmit a rotational force and is configured by the first connection lever 51, a second connection lever 52, and a biasing spring 53, as shown in FIG. 8.

The first connection lever 51 is formed by bending a thin stainless-steel plate or the like into a substantially U-shape and includes a connection portion 51a, a pair of engagement pieces 51b, and a pair of restriction pieces 51c.

The connecting portion 51a is formed into a substantially flat plate shape, and has, at the centre of the connecting portion 51a, the substantially rectangular fitting hole h1 into which the end portion 25 of the valve shaft 20 can be removably fitted.

The pair of engagement pieces 51b is engaged with the second connection lever 52 and is formed to be bent into a crank shape from the connection portion 51a. The pair of engagement pieces 51b plays a role of restricting displacement of the biasing spring 53 and is formed to be capable of being engaged with engagement holes 52d through slits 52c of the second connection lever 52.

The pair of restricting pieces 51c restricts the displacement of the biasing spring 53, and is respectively formed to be bent into an L-shape from the connecting portions 51a at a position displaced from the pair of engagement pieces 51b by about 90 degrees around the axis S.

The second connection lever 52 is formed by bending a thin stainless-steel plate or the like into a substantially U-shape and includes a connection portion 52a, a pair of arms 52b, a pair of slits 52c, and a pair of engagement holes 52d.

The connecting portion 52a is connected to the rotation shaft 62 of the drive unit 60 and formed into a substantially flat plate shape, and includes, at the centre of the connecting portion 52a, a substantially rectangular fitting hole h2 into which the rotation shaft 62 of the drive unit 60 can be removably fitted.

The pair of arms 52b are formed to be respectively bent into a substantially L-shape from the connecting portion 52a and restrict the displacement of the biasing spring 53 disposed inside the pair of arms 52b.

Each slit 52c is formed in the corresponding arm 52b and is formed to have a dimension that allows the engagement piece 51b to pass when the first connection lever 51 is assembled to be engaged with the second connection lever 52.

Each engagement hole 52d is formed in the corresponding arm 52b continuously with the slit 52c and is formed to have a dimension that the engagement piece 51b of the first connection lever 50 is immovable around the axis S and is movable by a predetermined amount in the direction of the axis S.

The biasing spring 53 is a compression-type coil spring and imparts, in a state where the first connection lever 51 and the second connection lever 52 are assembled to engage with each other and mounted on the valve device M, a biasing force which pushes the first connection lever 51 and the second connection lever 52 in the direction of the axis S to prevent backlash between the first connection lever 51 and the second connection lever 52.

The connection mechanism 50 having the above configuration is assembled as follows.

First, the first connection lever 51 and the second connection lever 52 are arranged in a manner that open sides of the U-shape face each other in a direction of a straight line in which the fitting hole h1 and the fitting hole h2 are arranged to be held to clamp the biasing spring 53.

Subsequently, the first connection lever 51 and the second connection lever 52 are relatively rotated around the straight line, and the engagement pieces 51b of the first connection lever 51 are inserted into the engagement holes 52d through the slits 52c of the second connection lever 52.

Then, when the first connection lever 51 and the second connection lever 52 are pushed by the biasing spring 53 in the straight line direction by the biasing force, the engagement pieces 51b are displaced from the slits 52c and the engagement state is maintained.

Thereby, the first connection lever 51 and the second connection lever 52 are engaged to be relatively movable across a predetermined range in the straight line direction, hold the biasing spring 53 not to displace, and form a module product which is assembled in a manner that the first connection lever 51 and the second connection lever 52 are not disengaged.

In the module product, the first connection lever 51 and the second connection lever 52 are in a state of being engaged to be relatively movable across a predetermined range in the linear direction and being assembled to rotate integrally around the straight line.

Then, the connection mechanism 50 which is the module product is assembled in a manner that the end portion 25 of the valve shaft 20 is fitted into the fitting hole h1 and the rotation shaft 62 of the drive unit 60 is fitted into the fitting hole h2, and thereby a connection state is obtained in which a rotational force is transmitted between the rotation shaft 62 and the valve shaft 20.

That is, the first connection lever 51 and the second connection lever 52 are in a state of being engaged to be relatively movable across a predetermined range in the direction of the axis S of the valve shaft 20 and being assembled to rotate integrally around the axis S.

Because the connection mechanism 50 having the above configuration includes the first connection lever 51 and the second connection lever 52 formed by bending thin plate-like members, compared with a case where a solid member or the like is employed, a passage area of the heat transmission is reduced and a surface area can be increased.

Thereby, the heat transmission from the valve shaft 20 to the rotation shaft 62 can be suppressed through the connection mechanism 50, and the heat radiation effect on the connection mechanism 50 can also be obtained.

The drive unit 60 imparts the rotational drive force on the valve shaft 20, and includes a case 61 defining an outer contour, the rotation shaft 62 protruding from the case 61, a drive source arranged inside the case 61, and a reduction gear interposed between the drive source and the rotation shaft 62.

The case 61 includes the flange portion 61a joined to the attachment portions 42 of the bracket 40, and a circular hole 61b formed in the flange portion 61a and through which a fastening bolt b1 passes.

The rotation shaft 62 includes, in a distal end region, a substantially rectangular cross-section portion that is removably fitted into the fitting hole h2 of the second connection lever 52.

The driving source is a DC motor, a torque motor or the like including an exciting coil, a permanent magnet, a rotor that rotates by an electromagnetic force, and the like.

Next, assembly of the valve device M having the above configuration is described.

The body 10, the bushes B, the cap C, the valve shaft 20, the screw 23a, the butterfly valve 30, the bracket 40, the connection mechanism 50, the drive unit 60, and the fastening bolt b1 are prepared.

Subsequently, the bushes B are fitted and fixed to the fitting holes 15 of the body 10.

Then, the valve shaft 20 is pivotably fitted to the bushes B of the body 10 through the valve shaft holes 14, and in this state, the butterfly valve 30 is fastened to the flat portion 23 of the valve shaft 20 using the screw 23a.

Then, the cap C is fitted and fixed to the concave portion 16 of the body 10.

Next, the bracket 40 is fixed to the legs 17 of the body 10.

Subsequently, the connection mechanism 50 is assembled by fitting the end portion 25 of the valve shaft 20 into the fitting hole h1.

Thereafter, the drive unit 60 is joined to the attachment portions 42 of the bracket 40 while the rotation shaft 62 is fitted into the fitting hole h2, and is fixed to the bracket 40 in a manner that the fastening bolt b1 is screwed into the screw hole 42b through the circular hole 61b.

Thereby, the valve device M is obtained in which the drive unit 60 is fixed to the body 10 via the bracket 40 and the plurality of legs 17.

Moreover, the above assembling method is an example, and assembling can be performed by other procedures.

Next, an operation when the valve device M is applied to an exhaust system of an engine mounted on an automobile is described.

Here, the drive of the drive unit 60 is appropriately controlled according to a control signal issued by a control unit, on the basis of various information relating to a running state of the automobile and an operating state of the engine.

Figure 9:
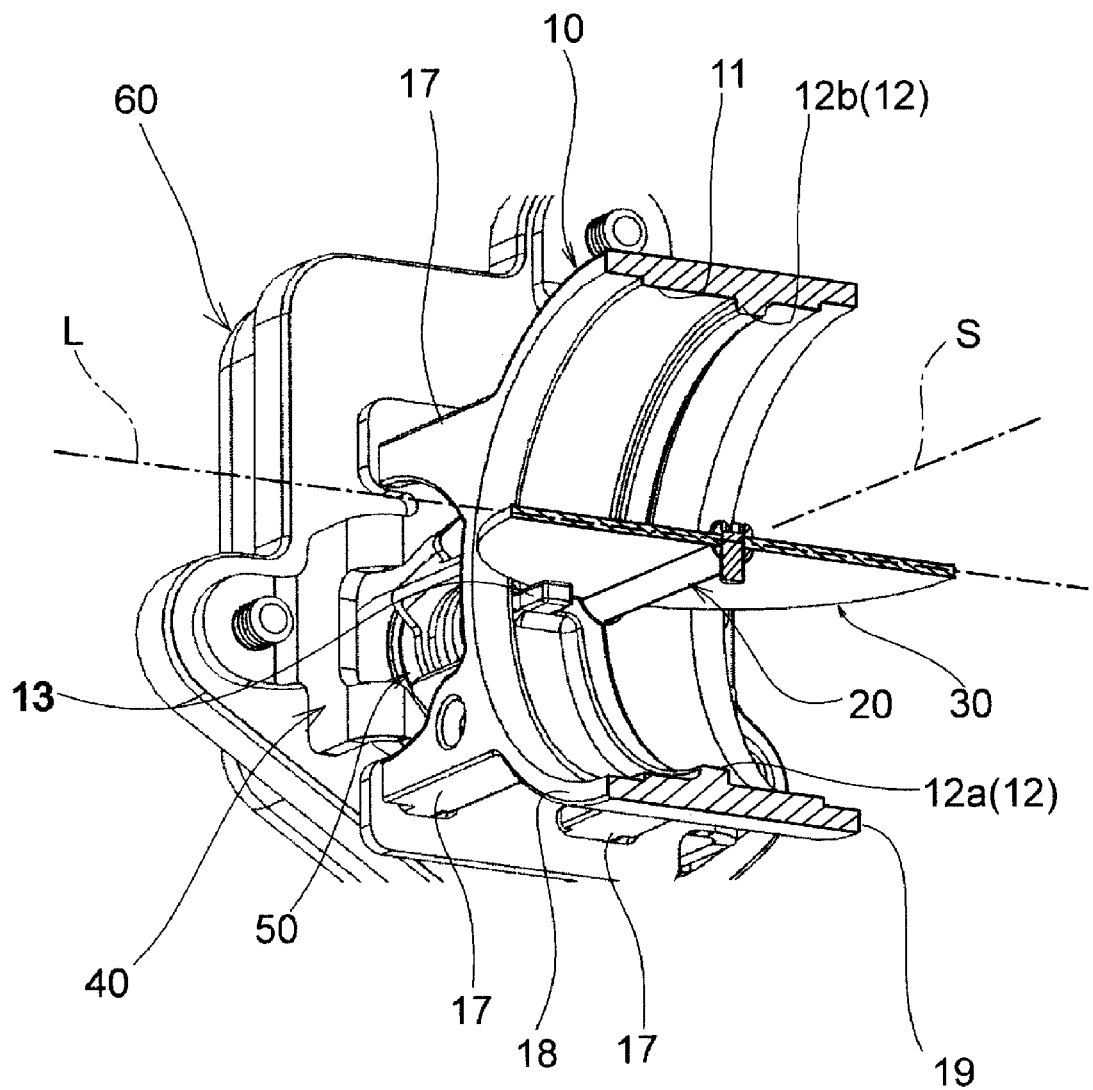
FIG. 9 is a perspective cross-sectional view showing, by a cross section, a state that a butterfly valve is in a full-open position in the valve device shown in FIG. 1.

For example, when the exhaust passage is fully opened, the valve shaft 20 is rotated in one direction by the drive unit 60, and the butterfly valve 30 abuts against the full-open stopper 13, as shown in FIG. 9. Thereby, the passage 11 is in the full-open state.

Figure 10:
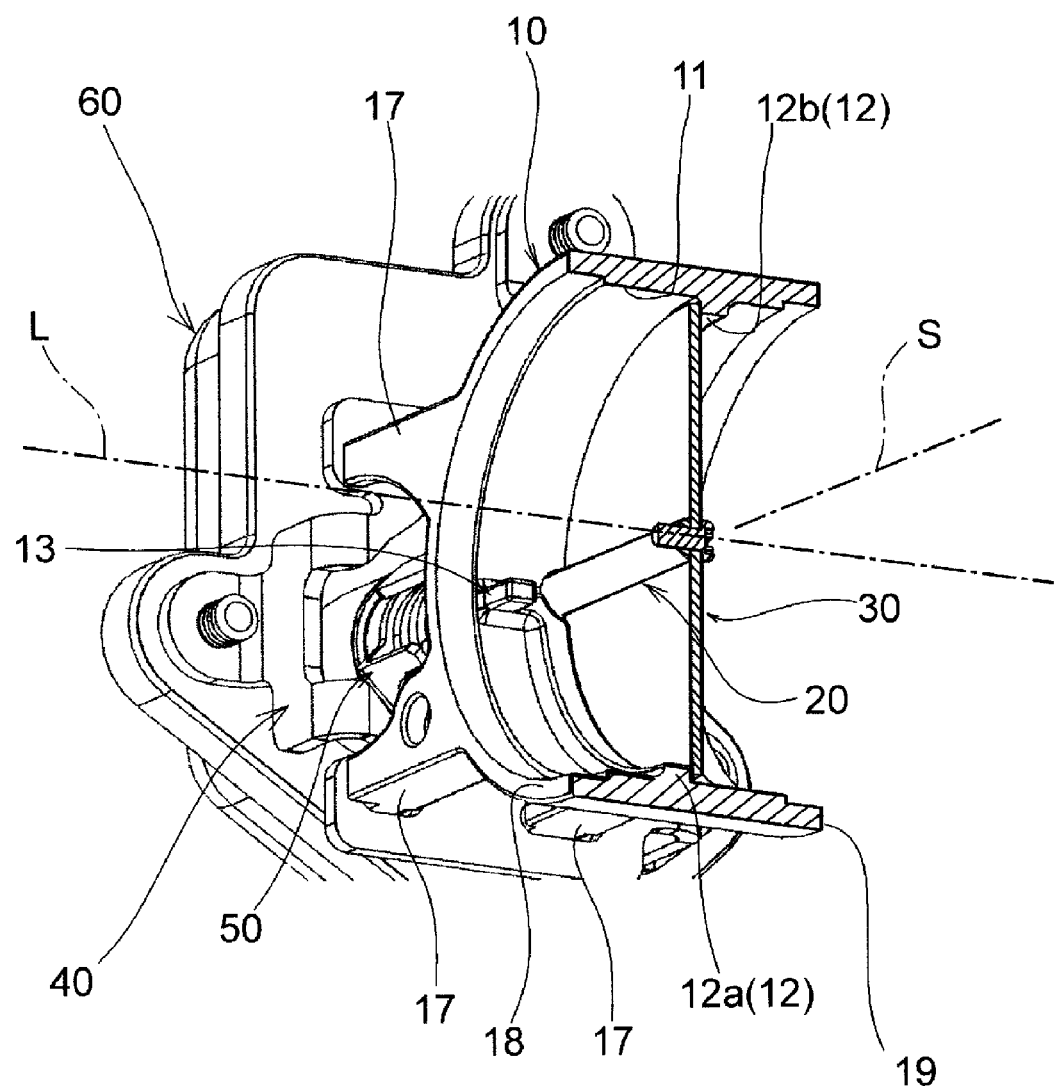
FIG. 10 is a perspective cross-sectional view showing, by a cross section, a state that the butterfly valve is in a full-close position in the valve device shown in FIG. 1.

On the other hand, when the exhaust passage is fully closed, the valve shaft 20 is rotated in the other direction by the drive unit 60, and the butterfly valve 30 abuts against the seal portion 12, as shown in FIG. 10. Thereby, the passage 11 is in the full-close state.

Figure 11:
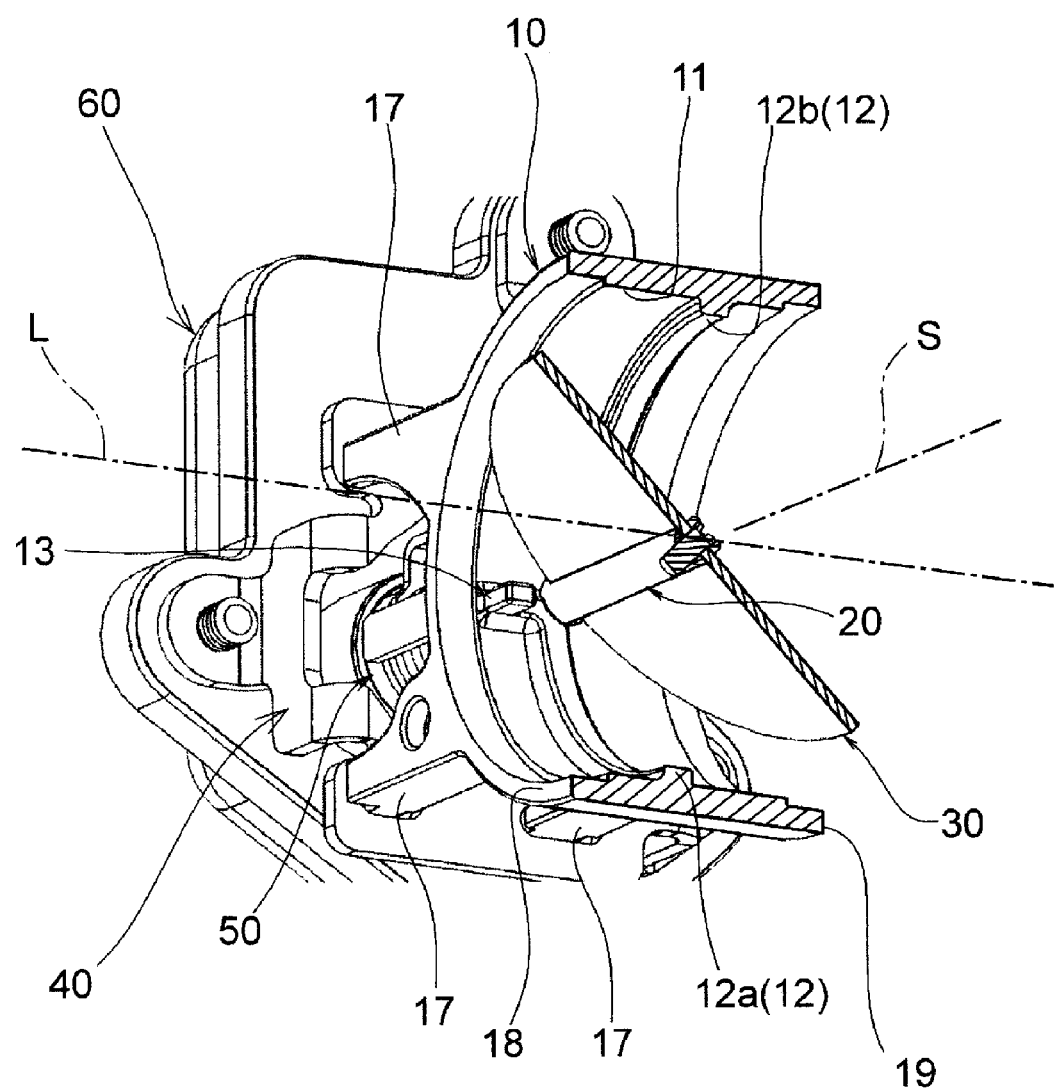
FIG. 11 is a perspective cross-sectional view showing, by a cross section, a state that the butterfly valve in an intermediate-open position in the valve device shown in FIG. 1.

In addition, when controlling the exhaust gas flowing through the exhaust passage to a predetermined amount, the valve shaft 20 is appropriately rotated in one direction or the other direction by the drive unit 60, and as shown in FIG. 11, the butterfly valve 30 is adjusted to a desired opening degree, and a flow rate of the exhaust gas flowing through the passage 11 is adjusted.

As described above, the butterfly valve 30 is controlled by the rotational drive force of the drive unit 60 to be opened and closed with high precision to not only the full-open state and the full-close state but also an intermediate open state narrowed to a predetermined opening degree, and thus the flow rate of the exhaust gas can be controlled to a desired flow rate with high precision, and various operation controls based on the flow rate control can be performed.

In particular, the valve device M employs a structure in which the influence of heat due to the high-temperature exhaust gas is suppressed or prevented for the drive unit 60, and thus the opening and closing operation of the passage 11 can be performed with high precision while desired durability is ensured.

In the above embodiment, the form is shown in which the body 10 defining the cylindrical passage 11 is employed as the body and the circular butterfly valve 30 is employed as the butterfly valve, but the present invention is not limited hereto. For example, a body that defines an elliptical passage may be employed as the body and an elliptical butterfly valve may be employed as the butterfly valve.

In the above embodiment, the form is shown in which four legs 17 are employed as the protrusion portion protruding from the body 10, but the present invention is not limited hereto, and the legs employed may have a number other than four. In addition, although the tapered legs 17 whose cross-sectional area decreases toward the distal end side are shown as the legs, but the present invention is not limited hereto, and legs in another form may be employed.

In the above embodiment, the form is shown in which the drive unit 60 is fixed to the protrusion portion of the body 10 via the bracket 40, but the present invention is not limited hereto, and a form in which the drive unit is directly fixed to the protrusion portion may be employed.

In the above embodiment, the connection mechanism 50 which includes the first connection lever 51, the second connection lever 52, and the biasing spring 53 is shown as the connection mechanism, but the present invention is not limited hereto, and a connection mechanism having another form may be employed as long as the connection mechanism can be interposed between the rotation shaft of the drive unit and the valve shaft and transmit a rotational force.

In the above embodiment, the form in which the drive unit 60 is fixed to the bracket 40 is shown; however, a configuration may also be employed in which a heat shield member is disposed in the gap between the bracket 40 and the case 61 of the drive unit 60.

Accordingly, the drive unit 60 can be prevented from being exposed to the radiant heat radiated from the outer wall 10a of the body 10 or the surface of the bracket 40, and the influence of heat can be further suppressed.

As described above, the valve device of the present invention can suppress or prevent the influence of the heat of the high-temperature fluid, and can perform the opening and closing operation of the passage with high precision, and thus the valve device of the present invention can certainly be applied to an exhaust system of an automobile or the like, and is also applicable to other vehicles and the like or other fields dealing with high-temperature fluid.

What is claimed is:

1. A valve device, comprising:
   a body defining a passage having a centre on a centre line through which fluid flows;
   a valve shaft pivotably supported by the body;
   a butterfly valve fixed to the valve shaft to open and close the passage; and
   a drive unit configured to impart a rotational drive force to the valve shaft,
   the body has a protrusion portion formed integrally in a manner of protruding from an outer wall of the body, and
   the drive unit is fixed to the body via the protrusion portion,
   wherein the body comprises a seal portion and a full-open stopper, the seal portion is formed protruding into the passage in order that the butterfly valve abuts, in a full-close state, against the seal portion, and
   the full-open stopper is formed protruding into the passage in order that the butterfly valve abuts, in a full-open state, against the full-open stopper,
   wherein the body is a cast product cast with a lost wax method,
   wherein the full-open stopper is formed at a position deviated toward one side in a direction of the centre line from a centre of the valve shaft, and the full-open stopper is formed adjacent and connected to the seal portion.

2. The valve device according to claim 1, wherein
   the protrusion portion comprises a plurality of legs protruding apart from each other on the outer wall of the body.

3. The valve device according to claim 2, wherein
   each of the plurality of legs is formed into a tapered shape in which cross-sectional area decreases from the outer wall of the body to a distal end side.

4. The valve device according to claim 1, comprising
   a bracket attached to a distal end portion of the protrusion portion, wherein
   the drive unit is fixed to the body via the bracket.

5. The valve device according to claim 4, wherein
   the bracket comprises a plate-shaped portion fixed to the protrusion portion, and an attachment portion that is formed bending from the plate-shaped portion and to which the drive unit is attached.

6. The valve device according to claim 1, wherein
the drive unit comprises a case defining an outer contour, and a rotation shaft protruding from the case, and
a connection mechanism configured to transmit a rotational force is arranged between the rotation shaft and the valve shaft,
wherein the connection mechanism comprises a first connection lever, a second connection lever, and a biasing spring, wherein the first connection lever is engaged to the second connection lever, and the biasing spring is located within the first connection lever and the second connection lever.

7. The valve device according to claim 6, wherein
the first connection lever is detachably connected to an end portion of the valve shaft, and the rotation shaft is detachably connected to the second connection lever.

8. The valve device according to claim 7, wherein
the second connection lever has a fitting hole to which the rotation shaft is removably fitted.

9. The valve device according to claim 7, wherein
the first connection lever and the second connection lever are engaged to be relatively movable across a predetermined range in an axis direction of the valve shaft, and
the biasing spring imparts a biasing force in the axis direction of the valve shaft.

* * * * *